United States Patent [19]
McCreery

[11] 3,934,320
[45] Jan. 27, 1976

[54] GROOVING AND CUT OFF TOOL

[75] Inventor: James F. McCreery, Latrobe, Pa.

[73] Assignee: Kennametal Inc., Latrobe, Pa.

[22] Filed: Nov. 1, 1974

[21] Appl. No.: 519,879

[52] U.S. Cl. ................................................. 29/96
[51] Int. Cl.² ....................................... B26D 1/00
[58] Field of Search .................. 29/95, 96, 97, 97.5

[56] References Cited
UNITED STATES PATENTS

| | | | |
|---|---|---|---|
| 1,912,666 | 6/1933 | Swanson | 29/95 |
| 3,499,198 | 3/1970 | Pollard et al. | 29/95 |
| 3,500,522 | 3/1970 | Stier | 29/96 |
| 3,543,363 | 12/1970 | Diemond | 29/96 |
| 3,596,337 | 8/1971 | Arnold | 29/96 |
| 3,688,366 | 9/1972 | Jones | 29/96 |
| 3,802,042 | 4/1974 | Novkov | 29/96 |
| 3,844,008 | 10/1974 | Sletten | 29/96 |

*Primary Examiner*—Harrison L. Hinson
*Attorney, Agent, or Firm*—Melvin A. Crosby

[57] ABSTRACT

A grooving and cut off tool in which a barlike holder is provided with a thin blade secured thereto at one end and projecting outwardly therefrom. The blade has a groove extending longitudinally along the upper edge thereof and a hard wear resistant insert is mounted in the groove near the forward end thereof.

A clamp member is provided which is secured to the bar-like holder by a screw and which has a portion also engaging the groove in the blade-like member rearwardly of the insert and with the clamp member having a resilient tongue engaging a notch provided in the top of the insert. The clamp member has an abutment region engaging the rearward end of the insert and the clamp member is adjustable in the fore and aft direction of the blade member to compensate for change in length of the insert when it is ground off at the outer end.

9 Claims, 11 Drawing Figures

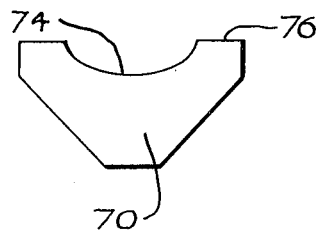
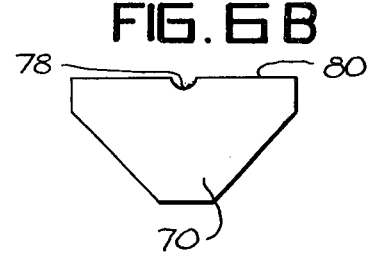
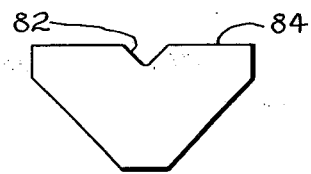
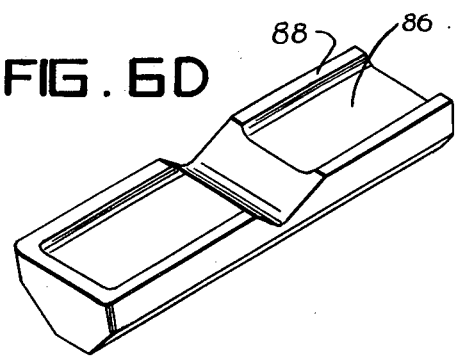
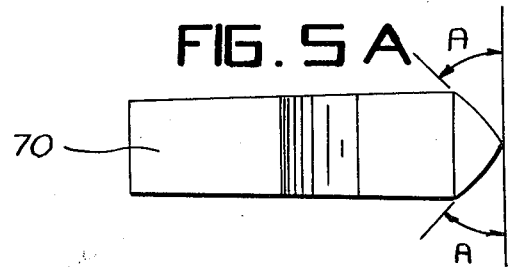

GROOVING AND CUT OFF TOOL

The present invention relates to cutting tools and is particularly concerned with a grooving and cut off tool.

Grooving and cut off tools are well known but heretofore have been somewhat expensive and have often required large, expensive, special inserts and have, many times, been rather weak in construction due to the rather thin support provided for the insert in order to enable it to perform cut off operations.

The tool according to the present invention is fabricated so as to present maximum strength for cut off operations while, at the same time, being economical to employ because of a provision for sharpening the insert and adjusting the position thereof on the cut off tool.

A particular object of the present invention is the provision of a grooving and cut off tool of the type referred to which is superior to tools that have been made heretofore.

Another object of this invention is the provision of a grooving and cut off tool which provides for fine adjustment of the hard wear resistant cutting insert forming a part thereof.

A still further object is the provision of a grooving and cut off tool in which an extremely small hard wear resistant cutting insert can be employed.

BRIEF SUMMARY OF THE INVENTION

According to the present invention, a bar-like tool holder is provided which at one end has a lateral recess in which a flat blade-like support element is seated and which is firmly attached to the holder. The blade-like support element has a longitudinal upwardly opening "V" shaped groove therein and, at the outer end of the groove, there is seated a hard wear resistant insert formed, for example, from cemented tungsten carbide and which, at the outermost end, is wider than the support element.

A clamp member is provided which is held on the holder by a clamp screw and which has a leg portion engaging the top of the holder on one side of the screw and a dependent portion on the other side of the screw which engages the groove in the top of the blade-like support element.

The clamp member has an abutment surface at one end which abuttingly engages the rearward end of the insert. The insert has a transverse notch in the top thereof and the clamp member has a thin finger-like projection which is about the same width as the support element with the outer end of the finger-like projection engaging the notch in the insert. The finger-like projection is separated from the main portion of the clamp member by a slot so that the finger-like projection is resilient thereby permitting the clamp member to set firmly on the blade-like support element while, at the same time, clamping the insert in position.

The screw which holds the clamp member on the tool holder extends through a longitudinal slot in the clamp member and an abutment screw is provided on the tool holder abutting the rearward end of the clamp member and which screw is adjustable for adjusting the clamp member in the longitudinal direction. This last mentioned adjustment permits the hard wear resistant insert to be sharpened by grinding thereof at the forward end and then, when the insert is replaced on the support element, the clamp member is advanced outwardly to compensate for the amount ground off during sharpening of the insert.

The exact nature of the present invention will become more apparent upon reference to the following detailed specification taken in connection with the accompanying drawings in which:

FIG. 5A is a top plan view of insert 70 showing a small chip curling clearance angle.

FIG. 6A is an end view of an additional modification of the upper side of insert 70.

FIG. 6B is an end view of an additional modification of the upper side of insert 70.

FIG. 6C is an end view of an additional modification of the upper side of insert 70.

FIG. 6D is a perspective view of an additional modification of the upper side of insert 70.

DETAILED DESCRIPTION OF THE INVENTION

Figure 1:
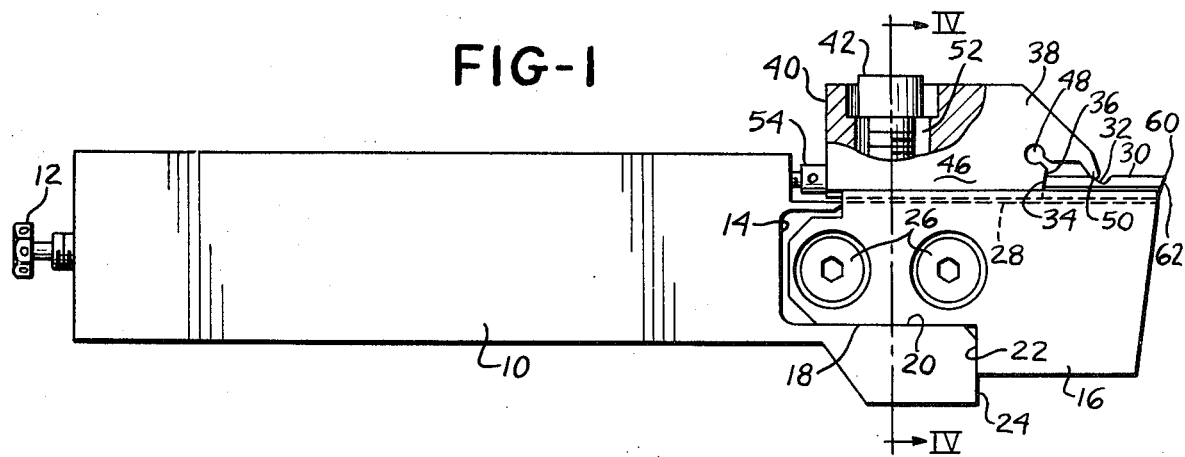
FIG. 1 is a side elevational view of a grooving and cut off tool according to the present invention partly broken away.
Figure 2:
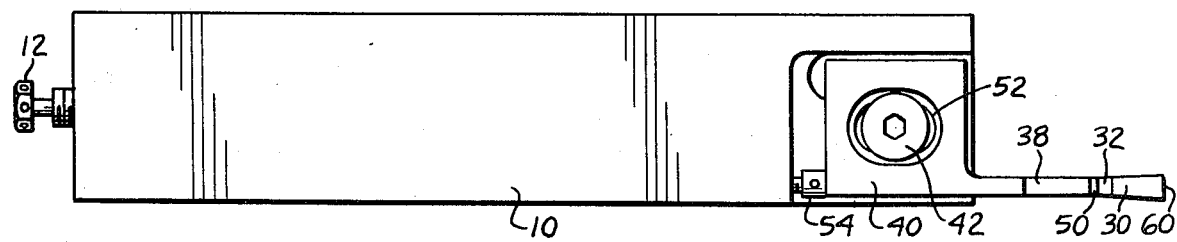
FIG. 2 is a plan view thereof looking down on top of FIG. 1.

Referring to the drawings somewhat more in detail, in FIGS. 1 to 4, 10 indicates a bar-like tool holder adapted for clamping in the tool post of a machine tool. The tool holder may comprise an adjustable abutment screw 12 at the inner end while, at the outer end, namely, the right end, the holder 10 is provided with a lateral recess 14 in which is seated a thin blade-like support element 16.

Support element 16 has a bottom edge 18 resting on the surface 20 at the bottom of recess 14 and has a dependent portion at the front end of the holder having a rearwardly facing surface 22 which abuts the surface 24 at the front end of holder 10.

Screws 26 which are preferably cone headed and recessed into support element 16 are provided for fixedly clamping the support element in recess 14 of holder 10.

The longitudinally extending upper edge of support element 16 is provided with an upwardly opening "V" shaped groove 28 and seated therein near the outer end of the groove is a hard wear resistant cutting insert 30 which may be formed, for example, of cemented tungsten carbide.

The insert 30 is relatively short and has a transverse notch 32 extending across the top intermediate the ends. The rearward end of the insert, indicated at 34, abuttingly engages an abutment surface 36 provided on a thin finger-like projection 38 formed on the forward end of a clamp member 40.

Figure 3:
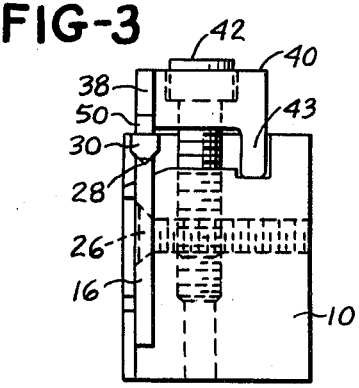
FIG. 3 is an end view looking in from the right end of FIG. 1.
Figure 4:
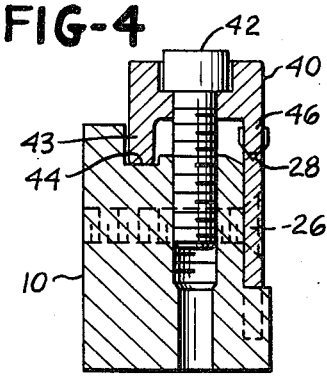
FIG. 4 is a sectional view indicated by line IV—IV on FIG. 1.

Clamp member 40 is secured to holder 10 by a screw 42 and, as will best be seen in FIGS. 3 and 4, clamp member 40 has a leg 42 at one side seated in a longitudinal recess 44 formed in the top of holder 10 while on the other side clamp member 40 has a thin dependent element 46 having a "V" shaped lower edge and seated in the groove 28 formed in the upper edge of element 16.

The aforementioned finger-like element 38 projecting from the holder is slotted as at 48 so that the nose portion 50 thereof which engages notch 32 is resiliently connected to the main portion of the clamp member. Thus, when screw 42 is tightened up, the clamp member is pulled down solidly against the tool holder 10 and also solidly engages the upper edge of support element 16 while, at the same time, the insert 30 is pulled backwardly against abutment shoulder 36 and pressed downwardly into groove 28.

The clamp screw 42 extends through a bore 52 in the clamp member which is elongated in the axial direction and this permits longitudinal adjustment of the clamp member. Such adjustment can be effected by an adjusting screw 54 threaded into the holder 10 immediately rearwardly of clamp member 40 as will be seen in FIGS. 1 and 2.

Figure 5:
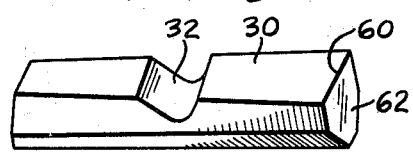
FIG. 5 is a perspective view showing a typical insert for use with the tool.

As to the insert 30, this will be seen in perspective in FIG. 5. The insert 30 has a cutting edge 60 at the forward end and an end face 62 which inclines rearwardly from the cutting edge in order to provide side clearance when the insert is engaging a workpiece. The insert tapers inwardly toward the rear so that the cutting edge 60 at the front is substantially wider than support element 16 as well as finger 38 of the clamp member whereby the kerf taken by the insert will have clearance on each side of the support element 16 and finger 38.

Figure 6:
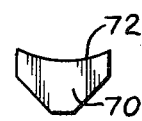
FIG. 6 is an end view of a modification of the insert in which the upper side of the insert is formed so as to be concave.

As will be seen in FIG. 6, an insert 70 could be formed so that the upper surface thereof was concave upwardly as indicated at 72. With such an arrangement, the chip taken by the insert tends to form into an upwardly concave curling configuration thereby to provide clearance between the chip and the sides of the slot from which it is being taken while, at the same time, assisting in curling the chip when the chip slides rearwardly over the insert and encounters the forwardly facing side of finger 38 of the clamp member. It will be noted that the forward side of finger 38 of the clamp member inclines upwardly and rearwardly and, thus, serves the function of curling chip flow as well as clamping the insert 30 in place in the tool.

The insert 30 previously referred to may have the forward end inclined rearwardly in the downward direction at an angle of about 6 degrees to provide side clearance from the work while the forward end of support element 16 may incline rearwardly at a greater angle, say, at about 10°. The insert 30 tapers inwardly toward the rear so as to provide side clearance from the sides of the slot or groove formed thereby and the included angle between the opposite sides of the insert may be from about 2 degrees to about 6 degrees.

It will be understood that the insert could be formed so as to incline upwardly toward the front, or the support element 16 could be so formed as to support the insert in an upwardly inclined position.

In the tool of the present invention, as has been mentioned, when the insert 30 becomes dull, it can be removed from the tool and ground off at the outer end. When the insert is placed back in the tool, an adjustment of clamp member 40 in the outward direction will restore the cutting insert to its original position in which it is supported over the full length by the support element 16.

It will be noted that the support element 16 is extremely solidly supported on holder 10 by the surfaces 18 and 22 of the support element which abut corresponding surfaces on the holder 10 and by the clamp screws 26. The tool according to the present invention is, thus, adapted for cut off operations which must be carried out at extremely high speed.

Looking again at FIG. 1, it should be appreciated that engagement of the groove 28 formed in the upper edge of element 16 with the "V" shaped lower edge of dependent element 16 provides extremely rigid support from lateral movement of support blade 16 during high speed cutting and grooving applications.

Referring to FIGS. 6A, 6B, 6C and 6D, here are shown alternate top surface and cutting edge arrangements which also provide that the chips taken by the insert tends to form into an upwardly concave curling configuration thereby providing clearance between the chip and the sides of the slot.

FIG. 6A shows an insert 70 formed so that the upper surface 74 thereof is concave upwardly intersecting land areas 76 on the sides thereof.

FIG. 6B shows an insert 70 formed so that the upper surface 80 thereof is flat except for a small groove 78 extending longitudinally the length of the insert.

FIG. 6C shows an insert 70 formed so that the upper surface 84 thereof is flat except for a "V" shaped groove extending longitudinally the length of the insert.

FIG. 6D shows an insert 70 formed so that the upper surface 88 consists of a flat land area which extends along the two side surfaces and the forward edge of the insert having a dished in recess extending from the land area rearwardly along the insert.

FIG. 5A is a top plan view of insert 70 showing an alternate construction of insert 70 and also a means of controlling chips such that they curl and form a clearance with the groove being cut. A small clearance angle A is provided which when cutting a workpiece forms a curled chip providing clearance between the groove and slot being formed and the workpiece.

Modifications may be made within the scope of the appended claims.

What is claimed is:

1. A grooving and cut off tool comprising; a bar-like holder, a support blade fixed to one side of said holder and projecting from one end thereof, said blade having a first longitudinal groove formed in the upper edge thereof, the forward end of which is adapted for receiving an insert, a second longitudinal groove formed in the top of the bar-like holder, a block-like clamping member mounted on said holder and having a longitudinal slot extending upwardly therein from the bottom and defining a pair of dependent leg members on the opposite sides of the clamp member, one said leg member engaging said second longitudinal groove in the top of the bar-like holder, the other said leg member lying in the plane of said support blade and engaging the first groove rearwardly of the insert with the forward end of said other leg abutting the rearward end of the said insert, resilient clamping means extending forwardly from said other leg over said insert and engaging the top of the insert when said other leg engages said first groove so that when said other leg is seated in said first groove, said resilient clamping means is pressed against the top of the insert, and a clamp bolt extending downwardly through said block-like clamp member between said dependent legs and threadedly engaging said holder, said block-like clamp member being slotted in the fore and aft direction to receive said clamp bolt and to permit fore and aft adjustment of the block-like clamp member on said holder.

2. A grooving and cut off tool according to claim 1 in which said resilient clamping means comprises a resilient finger at the forward end of said other leg extending forwardly therefrom over said insert, means connecting the rearward end of said finger to the forward end of said other leg.

3. A grooving and cut off tool according to claim 1 in which the insert has a cutting edge formed by the intersection of the top surface thereof and the forward end face thereof, said cutting edge having a width greater than the width of said support blade and said resilient clamping means, said forward end face inclining downwardly and rearwardly from the cutting edge when the insert is mounted in the tool and the insert having two side faces extending downwardly and inwardly from said top surface, said groove in the upper edge of said support member being "V" shaped in cross section, the insert having on the bottom a "V" shaped surface engaging the groove in the support blade, the insert tapering inwardly toward the rear.

4. A grooving and cut off tool according to claim 2 in which said finger is an integral part of said leg of said clamping member, said finger being formed by a slot extending upwardly and rearwardly into said dependent leg and defining an integral connection between said finger and said dependent leg at a point remote from the end of the finger which engages said insert.

5. A grooving and cut off tool according to claim 2 in which the forward side of said finger inclines upwardly and rearwardly thereby providing chip curling.

6. A grooving and cut off tool according to claim 3 in which said top surface of the insert is transversely grooved to engage the said finger on the clamping member, the position of said groove on said insert top surface being such that engagement between the finger and groove occurs in the rearwardly slope of said groove.

7. A grooving and cut off tool according to claim 1 which includes a screw threaded means in said holder engaging the rearward end of said clamp member for adjusting the fore and aft position of the clamp member on the holder.

8. A grooving and cut off tool according to claim 1 in which a recess is formed in one lateral side of said holder at the forward end of said holder, the rearward end of said support blade being securely disposed within said recess for engagement and support thereof.

9. A grooving and cut off tool according to claim 8 in which the recess has an upwardly facing longitudinally extending lower edge portion, said support blade having a rearwardly facing portion which abutting the forward end of said holder, and said support blade having a longitudinal downward facing edge resting on said lower edge portion of said recess.

* * * * *